(12) United States Patent
Ben Aharon

(10) Patent No.: US 9,548,628 B2
(45) Date of Patent: Jan. 17, 2017

(54) SYSTEM, METHOD AND APPARATUS FOR PORTABLE POWER SUPPLY

(76) Inventor: Yaakov Shmuel Haim Ben Aharon, Kiryat Malachi (IL)

(*) Notice: Subject to any disclaimer, the term of this patent is extended or adjusted under 35 U.S.C. 154(b) by 449 days.

(21) Appl. No.: 14/129,995

(22) PCT Filed: Jun. 26, 2012

(86) PCT No.: PCT/IL2012/050219
§ 371 (c)(1),
(2), (4) Date: Dec. 30, 2013

(87) PCT Pub. No.: WO2013/001533
PCT Pub. Date: Jan. 3, 2013

(65) Prior Publication Data
US 2014/0132069 A1    May 15, 2014

(30) Foreign Application Priority Data
Jun. 28, 2011 (IL) .......................... 213824

(51) Int. Cl.
| H01H 83/00 | (2006.01) |
| H02H 3/00 | (2006.01) |
| H01H 47/00 | (2006.01) |
| H02J 9/00 | (2006.01) |
| H02J 1/10 | (2006.01) |
| H02J 7/00 | (2006.01) |

(52) U.S. Cl.
CPC .................. *H02J 9/00* (2013.01); *H02J 1/108* (2013.01); *H02J 7/0054* (2013.01); *H02J 7/0055* (2013.01); *Y10T 307/367* (2015.04); *Y10T 307/625* (2015.04)

(58) Field of Classification Search
CPC ............ H02J 9/00; H02J 1/108; H02J 7/0054; H02J 7/025; Y10T 307/625; Y10T 307/367
USPC ...................... 307/26, 66, 112, 125, 130–131
See application file for complete search history.

(56) References Cited

U.S. PATENT DOCUMENTS

| 4,300,087 A | * | 11/1981 | Meisner | ............... | H04B 1/1607 |
| | | | | | 307/150 |
| 5,889,384 A | * | 3/1999 | Hayes | ..................... | H02J 7/025 |
| | | | | | 307/66 |

(Continued)

*Primary Examiner* — Rexford Barnie
*Assistant Examiner* — Rasem Mourad
(74) *Attorney, Agent, or Firm* — Mark M. Friedman

(57) ABSTRACT

The invention is a portable power supply having a built in battery, switch matrix, external voltage and impedance sensing means, inverter, and charging circuitry. The device uses a power plug for receiving AC from a wall electric receptacle; a transformer for transforming high voltage input to a low voltage output; a rectifier, for rectifying the low alternating voltage to direct voltage; at least one battery rechargeable by said direct voltage; an inverter, for inverting direct voltage supplied by the rechargeable battery to relatively low alternating voltage, which is supplied to the secondary winding of the transformer; and an alternating current (AC) socket, for receiving high voltage from the primary winding of the transformer. Both AC and DC of various voltages may be supplied by this device in a portable manner, which uses a single transformer both for recharging batteries and for supplying AC power produced via the batteries. A switching assembly allows for connecting the batteries (which may be rechargeable) in a variety of topologies.

11 Claims, 11 Drawing Sheets

(56) References Cited

U.S. PATENT DOCUMENTS

| | | | | |
|---|---|---|---|---|
| 6,268,711 B1* | 7/2001 | Bearfield | ............... | H02J 7/0024 320/116 |
| 2004/0150373 A1* | 8/2004 | Chan | ....................... | F02N 11/14 320/165 |
| 2008/0180061 A1* | 7/2008 | Koski | ................. | H01M 10/441 320/117 |
| 2009/0295330 A1* | 12/2009 | Li | ......................... | H02J 7/0013 320/124 |
| 2010/0013323 A1* | 1/2010 | Chung | ................. | H02H 11/005 307/125 |
| 2010/0289447 A1* | 11/2010 | Dobson | ................. | H01M 10/46 320/101 |
| 2011/0090726 A1* | 4/2011 | Brotto | ................... | H02J 7/0065 363/131 |
| 2011/0148358 A1* | 6/2011 | Lee | .................... | H01R 13/6675 320/114 |

* cited by examiner

SYSTEM, METHOD AND APPARATUS FOR PORTABLE POWER SUPPLY

BACKGROUND

Technical Field

The present invention relates to the field of power supplies. More particularly, the invention relates to a method and apparatus for a multi-functional power supply.

Description of Related Art

Electronic devices generally require a certain specific input voltage at a given polarity and maximum current draw. Generally each device will therefore require a separate power supply There is thus a long felt need to provide a general power supply, capable of supplying power to various devices by one single apparatus.

It is an object of the present invention to provide a solution to the above-mentioned and other problems of the prior art. Other objects and advantages of the invention will become apparent as the description proceeds.

BRIEF SUMMARY

The invention is a portable power supply having a built in battery, switch matrix, external voltage and impedance sense, inverter, and charging circuitry.

It is within provision of the invention to disclose a portable power supply (10) comprising:
 a. a power plug (24), for receiving alternating current (AC) power from a wall electric receptacle;
 b. a transformer (54), whose primary winding (62) is switchably connected to said AC power, transforming said relatively high alternating voltage to a relatively low alternating voltage at the secondary winding (60) of said transformer,
 c. a rectifier (56), for rectifying said relatively low alternating voltage to direct voltage;
 d. at least one battery (34) rechargeable by said direct voltage;
 e. an inverter (58), for inverting direct voltage supplied by said at least one rechargeable battery (34) to relatively low alternating voltage, and for supplying said relatively low alternating voltage to said secondary winding (60) of said transformer (54); and
 f. an alternating current (AC) socket (12), for receiving relatively high alternating voltage from said primary winding (62) of said transformer (54), and for supplying thereof in a portable manner,
thereby utilizing a single transformer (54) both for recharging said at least one battery (34) and for supplying AC power produced via said at least one battery (34).

It is further within provision of the invention to disclose the aforementioned portable power supply (10), further comprising switching (64) means, adapted for switching between recharging said batteries 34 from said power plug (24), and supplying power from said at least one rechargeable battery (34) to said AC socket (12).

It is further within provision of the invention to disclose the aforementioned portable power supply wherein said rectifier (56) comprises a Wheatstone diode bridge.

It is further within provision of the invention to disclose the aforementioned portable power supply wherein said inverter (58) comprises polarity-reversing switches.

It is further within provision of the invention to disclose the aforementioned portable power supply wherein said at least one rechargeable battery (34) comprises a plurality of rechargeable batteries (34), and wherein said portable power supply (10) further comprises:
 a. a switching assembly (44), for connecting said rechargeable batteries (34) in a plurality of topographies; and
 b. an alternating current (AC) to direct current (DC) converter (46) connected to said switching assembly (44), for charging said plurality of batteries (34),
wherein said switching assembly is adapted for supplying a desired voltage and from said batteries (34) to said inverter, and for charging said batteries (34) from said converter (46) at said converter voltage.

It is further within provision of the invention to disclose the aforementioned portable power supply further comprising a voltage meter (40) adapted for measuring voltage of a battery of an external device (50) connected to said power supply (10), and further wherein said switching assembly (44) is adapted to change the switch topology so as to output a voltage that is a desired function of the measured voltage of external device (50).

It is further within provision of the invention to disclose the aforementioned portable power supply wherein said desired function is $$V_{out} = \begin{cases} V_{extant} + \delta V; V_{extant} > V_{threshold} \\ A\sin(\omega t); V_{extant} < V_{threshold} \text{ and } Z_{extant} > Z_{threshold} \end{cases}$$

where Vextant is the measured voltage of the device to be powered, Vthreshold is the threshold voltage, Zextant is the measured impedance of the device to be powered, and Zthreshold is the threshold impedance.

It is further within provision of the invention to disclose the aforementioned portable power supply wherein said at least one rechargeable battery (34) comprises lithium-ion batteries, thereby providing relatively high output currents.

It is further within provision of the invention to disclose the aforementioned portable power supply further comprising a USB port (18), for outputting voltage supplied by said batteries (34).

It is further within provision of the invention to disclose the aforementioned portable power supply further comprising crocodile clips (30), for outputting voltage supplied by said batteries (34), thereby providing means for starting a car.

It is within provision of the invention to disclose a method for supplying power, said method comprising the steps of:
 a. transforming relatively high alternating voltage from a wall electric receptacle, by means of a transformer (54), to a relatively low alternating voltage;
 b. rectifying said relatively low alternating voltage to direct voltage;
 c. recharging at least one battery (34) by said direct voltage;
 d. inverting direct voltage supplied by said at least one battery (34) to relatively low alternating voltage;
 e. transforming said relatively low alternating voltage, by means of said transformer (54), to a relatively high alternating voltage; and
 f. supplying said relatively high alternating voltage in a portable manner;
thereby utilizing a single transformer (54) both for recharging said at least one battery (34) and for supplying AC power produced via said at least one battery (34).

It is further within provision of the invention to disclose the aforementioned method further comprising steps of:

a. using a switching assembly (44) to change the input voltage of said rechargeable batteries (34) to match the output of an AC to DC converter (46);
b. connecting said switched batteries (34) to said AC to DC converter (46), for charging thereof;
c. upon said batteries being charged, disconnecting said batteries from said AC to DC converter (46);
d. using a switching assembly (44) to supply power to said external device (50) at a desired voltage; and,
e. connecting an external device (50) to said batteries (34).

It is further within provision of the invention to disclose the aforementioned method wherein said step of rectifying is accomplished by means of a Wheatstone diode bridge.

It is further within provision of the invention to disclose the aforementioned method wherein said step of inverting is accomplished by means of polarity-reversing switches.

In one aspect the present invention is directed to a portable power supply comprising:
a. a power plug, for receiving alternating current (AC) power from a wall electric receptacle;
b. a transformer, for introducing relatively high alternating voltage to a primary winding thereof, for transforming that relatively high alternating voltage to a relatively low alternating voltage to a secondary winding thereof;
c. a rectifier, for rectifying the relatively low alternating voltage to direct voltage;
d. at least one battery rechargeable by the direct voltage;
e. an inverter, for inverting direct voltage supplied by the at least one rechargeable battery to relatively low alternating voltage, and for supplying the relatively low alternating voltage to the secondary winding of the transformer; and
f. an alternating current (AC) socket, for receiving relatively high alternating voltage from the primary winding of the transformer, and for supplying thereof in a portable manner, thereby utilizing a single transformer both for recharging the at least one battery and for supplying AC power produced via the at least one battery.

The portable power supply may further comprise: switching means, for allowing either the at least recharging from the power plug, or the power supplying from the at least one rechargeable battery to the AC socket.

It is further within provision of the invention that the rectifier may comprise a Wheatstone diode bridge.

It is further within provision of the invention that the inverter may comprise polarity-changing switches.

The rechargeable battery may comprise a plurality of rechargeable batteries, and the portable power supply may further comprise:
a. a switching assembly, for switching between the rechargeable batteries, each connected separately to the switching assembly; and
b. an alternating current (AC) to direct current (DC) converter connected to the switching assembly, for charging the plurality of batteries,
wherein the switching between the rechargeable batteries may be adapted for supplying desired voltage and current from the batteries, and for charging the batteries from the converter.

The power supply may further comprise a voltage meter, for measuring the voltage of a battery of the external device if it is supplied with one, and for indicating the measurement to the switching assembly.

The at least one rechargeable battery may comprise lithium-ion batteries, thereby providing relatively high output currents.

The power supply may further comprise a USB port, for outputting voltage supplied by the batteries.

The power supply may further comprise crocodile clips, for outputting voltage supplied by the batteries, thereby providing means for starting a car.

In another aspect the present invention is directed to a method for supplying power, the method comprising the steps of:
a. transforming relatively high AC power from a wall electric receptacle, by means of a transformer, to a relatively low alternating voltage;
b. rectifying the relatively low alternating voltage to direct voltage;
c. recharging a battery by the direct voltage;
d. inverting direct voltage supplied by the battery to relatively low alternating voltage;
e. transforming the relatively low alternating voltage to a relatively high alternating voltage by means of said transformer; and
f. supplying the relatively high alternating voltage in a portable manner.
thereby utilizing a single transformer both for recharging the at least one battery and for supplying AC power produced via the at least one battery.

The method may further comprise the steps of:
a. switching between a plurality of rechargeable batteries to adapt to an AC to DC converter;
b. connecting the switched batteries to the AC to DC converter, for charging thereof;
c. upon the batteries being charged, disconnecting the batteries from the AC to DC converter;
d. connecting an external device to the batteries; and
e. changing the switching between the plurality of batteries to supply power to the external device.

The method may further comprise the steps of:
a. measuring voltage of a battery of the external device; and
b. adapting the switching to provide a power having the measured voltage,
thereby supplying to the external device power in a voltage corresponding to its consuming characteristics.

The method may further comprise the steps of:
a. disconnecting the external device from the batteries;
b. measuring voltage of the battery of the external device; and
c. providing appropriate switching between the batteries for the supplying power to the external device,
thereby providing appropriate switching according to the charged state of the battery of the external device.

The foregoing embodiments of the invention have been described and illustrated in conjunction with systems and methods thereof, which are meant to be merely illustrative, and not limiting.

BRIEF DESCRIPTION OF THE DRAWINGS

In order to understand the invention and to see how it may be implemented in practice, a plurality of embodiments will now be described, by way of non-limiting example only, with reference to the accompanying drawings, in which.

Figure 1:
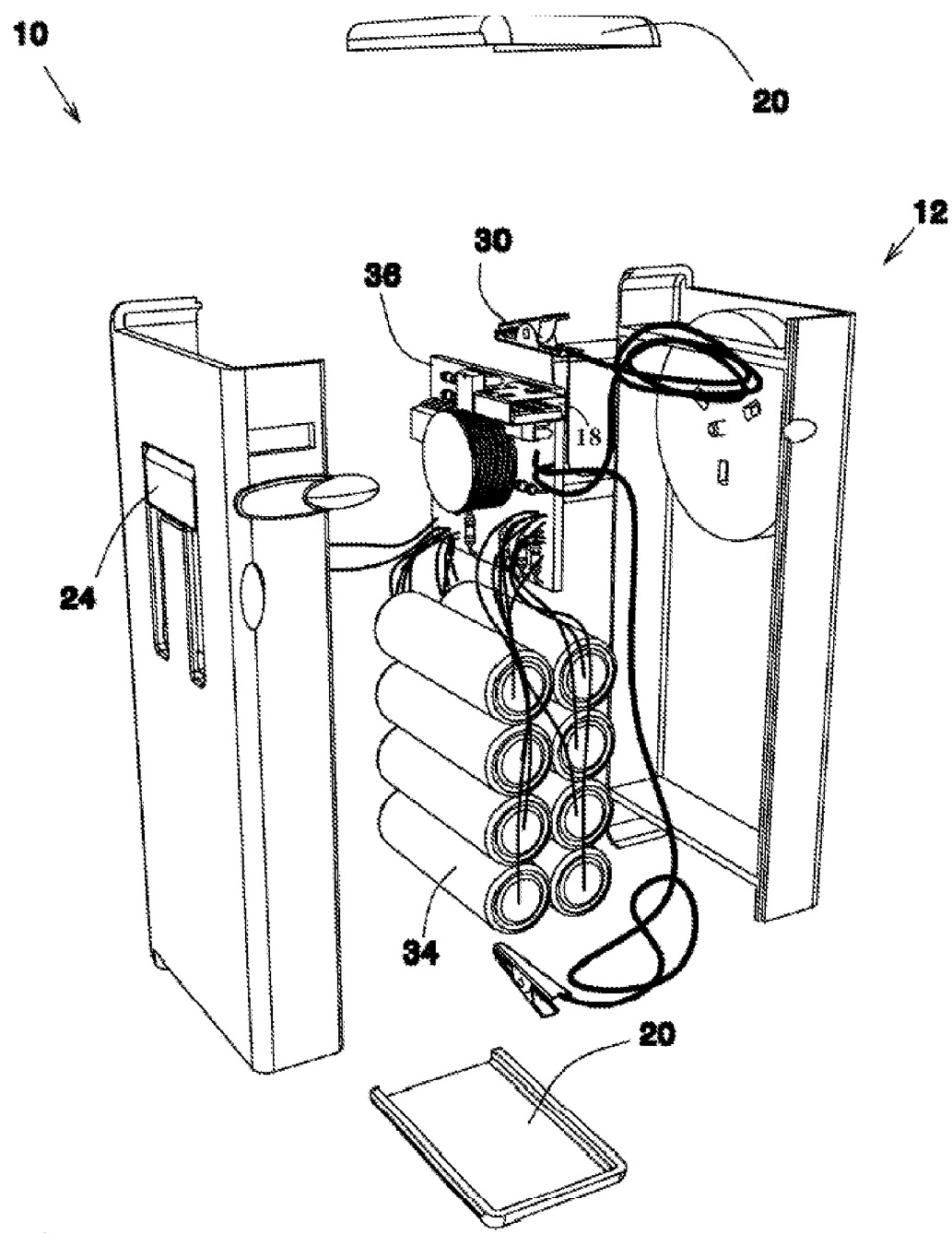
FIG. 1 is an exploded view of a power supply according to one embodiment of the present invention.

In the figures and/or description herein, the following reference numerals have been utilized throughout the figures:

numeral 10 denotes a power supply according to one embodiment of the present invention;
numeral 12 denotes an AC socket;
numeral 16 denotes a button;
numeral 18 denotes a USB port;
numeral 20 denotes a cover;
numeral 24 denotes a power plug;
numeral 30 denotes a wire and a clip;
numeral 34 denotes a battery;
numeral 36 denotes a circuitry assembly;
numeral 40 denotes a Volt meter or an Ohm meter;
numeral 42 denotes an electrical convertor;
numeral 44 denotes a switching circuitry;
numeral 46 denotes an AC to DC convertor;
numeral 48 denotes a controller;
numeral 50 denotes a load;
numeral 52 denotes a switch;
numeral 54 denotes a transformer;
numeral 56 denotes a rectifier;
numeral 58 denotes a DC to AC inverter;
numeral 60 denotes a secondary winding of the transformer; and
numeral 62 denotes a primary winding of the transformer.

It should be understood that the drawings are not necessarily drawn to scale.

DETAILED DESCRIPTION

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for providing a system and method for portably supplying power.

In the following detailed description, numerous specific details are set forth in order to provide a thorough understanding of embodiments of the present invention. However, those skilled in the art will understand that such embodiments may be practiced without these specific details. Reference throughout this specification to "one embodiment" or "an embodiment" means that a particular feature, structure, or characteristic described in connection with the embodiment is included in at least one embodiment of the invention.

The term 'plurality' refers hereinafter to any positive integer (e.g., 1, 5, or 10).

The present invention will be understood from the following detailed description of preferred embodiments, which are meant to be descriptive and not limiting. For the sake of brevity, some well-known features, methods, systems, procedures, components, circuits, and so on, are not described in detail.

The present invention is directed to a portable power supply (10) comprising: a power plug (24), for receiving alternating current (AC) power from a wall electric receptacle; a transformer (54) for transforming relatively high alternating voltage input to a relatively low alternating voltage output; a rectifier (56), for rectifying the relatively low alternating voltage to direct voltage; at least one battery (34) rechargeable by said direct voltage; an inverter (58), for inverting direct voltage supplied by the at least one rechargeable battery (34) to relatively low alternating voltage, which is supplied to the secondary winding (60) of the transformer (54); and an alternating current (AC) socket (12), for receiving relatively high alternating voltage from the primary winding (62) of the transformer (54). Both AC and DC of various voltages may be supplied by this device in a portable manner, which uses a single transformer (54) both for recharging batteries (34) and for supplying AC power produced via the batteries (34).

FIG. 1 is an exploded view of a power supply according to one embodiment of the present invention.

A power supply 10 includes a plurality of batteries 34, each separately connected to a circuit assembly 36; an AC power plug 24 connected to circuit assembly 36 for charging batteries 34; and power output ports, which may include a USB port 18, an AC socket 12, crocodile clips 30, and others.

Figure 2:
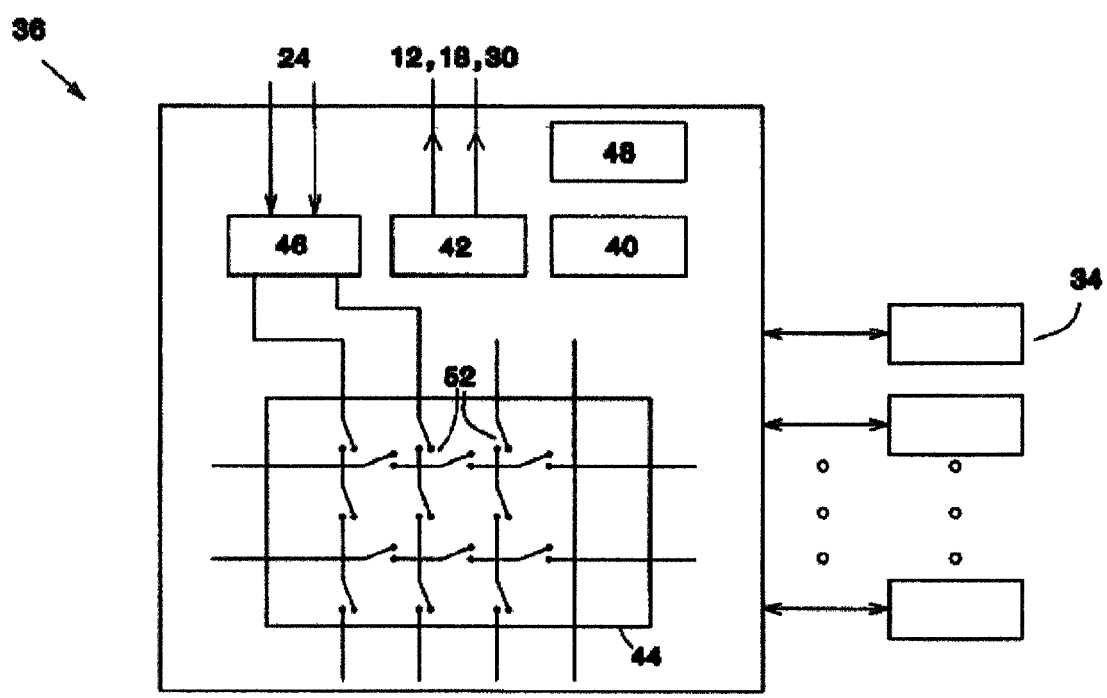
FIG. 2 schematically illustrates the circuitry of FIG. 1.

FIG. 2 schematically illustrates the circuitry of FIG. 1.

Circuit assembly 36 includes a switching assembly 44, which includes an array of switches 52. By felicitous connection of switches 44, batteries 34 may be connected in multiple combinations (series, parallel, and hybrids thereof) so as to obtain a selected voltage and current-draw capability.

Circuit assembly 36 also includes an alternating current (AC) to direct current (DC) convertor 46 receiving AC power from power plug 24; a converter 42 providing output power to socket 12, 18 and/or 30; and a voltage/resistance meter 40. Preferably, a controller 48 controls the elements of circuit assembly 36.

Figure 3:
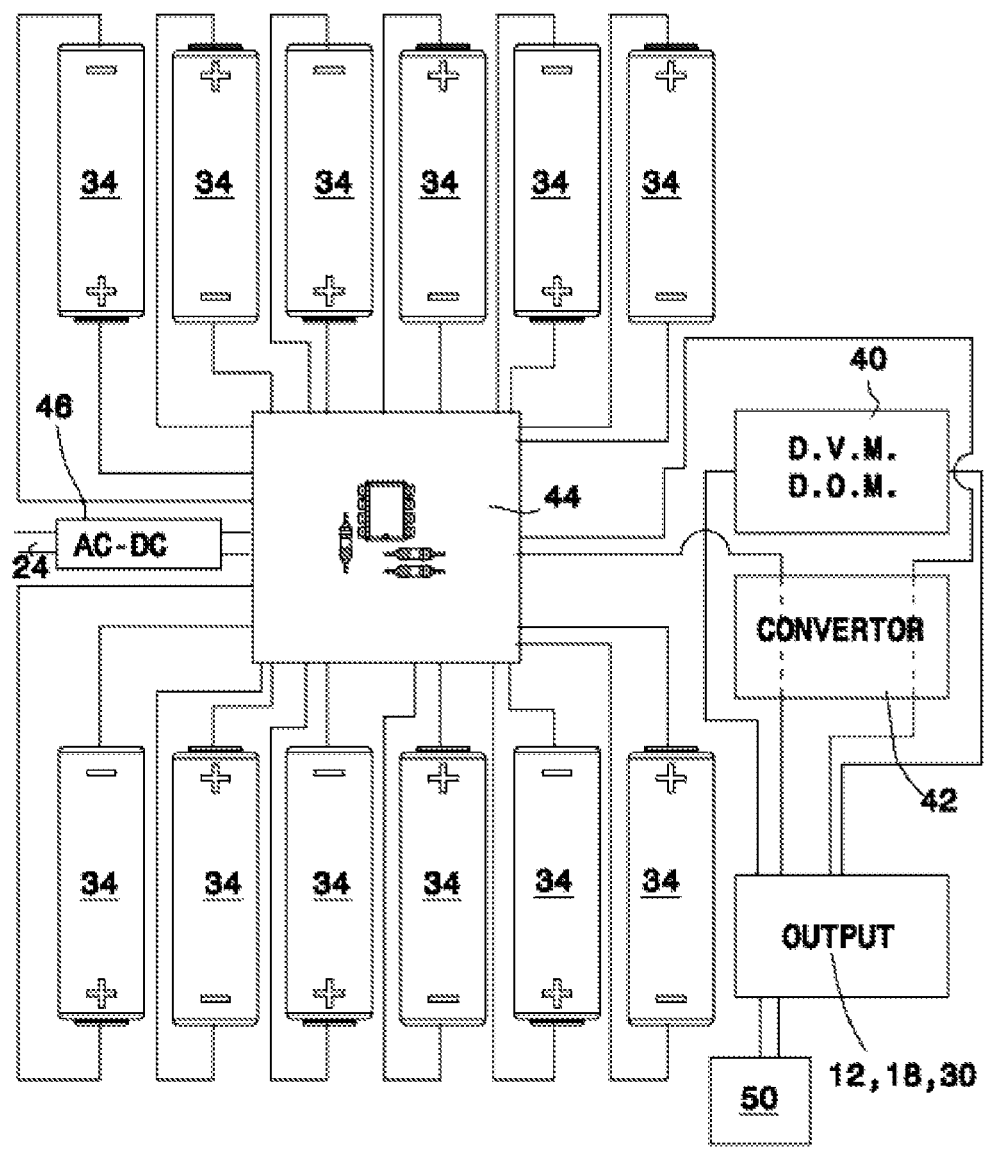
FIG. 3 is a circuit of the power supply of FIG. 1 according to one embodiment.

FIG. 3 is a physical circuit layout of the power supply of FIG. 1 according to one embodiment of the invention.

In this embodiment, power plug 24 supplies AC power via AC-DC convertor 24 (as will be familiar to one skilled in the art) to switching circuitry 44. Switching circuitry 44 switches the batteries 34 to best match the incoming rectified voltage. For example, if the AC-DC convertor 24 supplies 132 volts, batteries 34 of 3.3 volts each may be switched using switching circuitry 44 to a topography of parallel strings of four batteries in series, obtaining 3.3V×4=13.2V. Upon charging batteries 34, plug 24 is removed from the wall socket.

If the batteries 34 are in a charged state, the device may be used (while not being charged itself) to power another device. For this purpose, one of the output ports 18, 12, or 30 is connected to a load 50.

One example of load 50 is a load including its own battery, e.g., a portable telephone including a rechargeable battery.

For purposes of matching supply voltage to device voltage, a Digital Volt Meter (DVM) 40 is supplied that measures the voltage of the battery of portable device 50, e.g. 9.9 volts, connections to the charging terminals of the device.

Once this voltage is determined (by means of the DVM, by manual switch, or by other means as will be known to those skilled in the art) switching circuitry 44 switches batteries 34 to supply the measured voltage, at the proper voltage polarity, to portable device 50. In the case of a DC-powered device the DC-AC convertor (inverter) 42 may be bypassed or shunted.

According to an example of 3.3 volt batteries in the inventive device and 9.9 measured voltage of the load device, switching circuitry 44 switches the batteries to a configuration where strings of three batteries in series are connected in parallel, to supply 3.3×3=9.9 volts.

In a subsequent step, switching circuitry 44 disconnects batteries 34 for an interval, and DVM 40 again measures the voltage across the terminals of portable device 50, e.g. 13.2 volts. This allows the invention to supply a changing voltage when being used to charge external devices, for example a rising voltage as a device charges.

Figure 4:
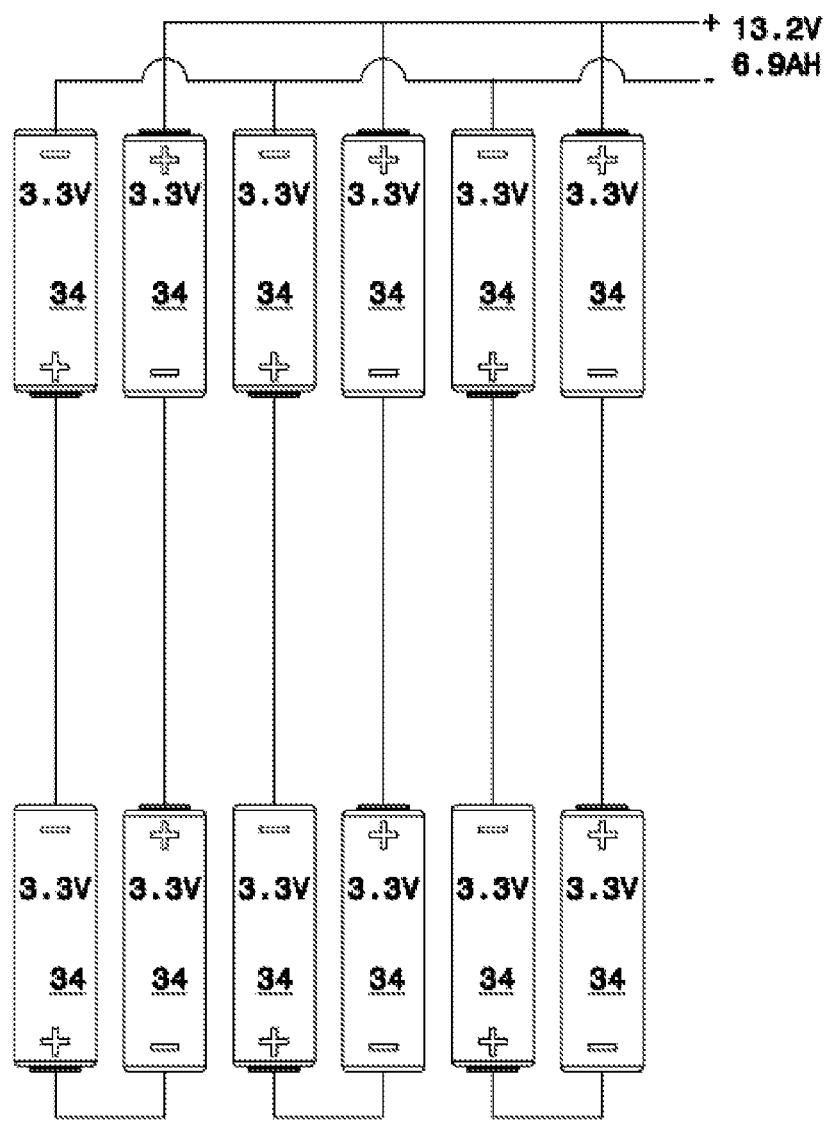
FIG. 4 depicts one switching configuration.

FIG. 4 depicts a battery topology of the first aforementioned configuration, namely three parallel strings of four batteries in series.

After each DVM voltage measurement, the switching circuitry 44 switches batteries 34 to supply the new desired voltage, which may be the measured load voltage, or a function thereof (for example, a voltage slightly higher than the measured voltage, to allow for charging a depleted device). In this example, switching circuitry 44 switches four batteries in series to supply 3.3×4=13.2 volts, and the other batteries in strings of four in series, each string in parallel to the others.

To continue the example using 2.3AH batteries, twelve such 3.3 volt batteries switched for supplying 13.2 volts provide 6.9 AH.

Another example of portable Device 50 is a load not including its own battery. In this case, Digital Volt Meter (DVM) 40 measures no voltage. Upon measuring no voltage, the DVM 40 is operated as or replaced by a Digital Ohm Meter (DOM).

Upon measuring infinite resistance, the user is invited to manually determine a DC voltage and the polarity thereof according to labeling of the device.

Upon measuring a resistance on the order of hundreds of ohms, the user is invited to confirm supplying AC power to the device, as in this case the device is likely to be one requiring AC power.

Switching circuitry 44 will thereupon switch batteries 34 to supply the voltage required for convertor 42 for converting this DC voltage to AC supply.

Figure 5:
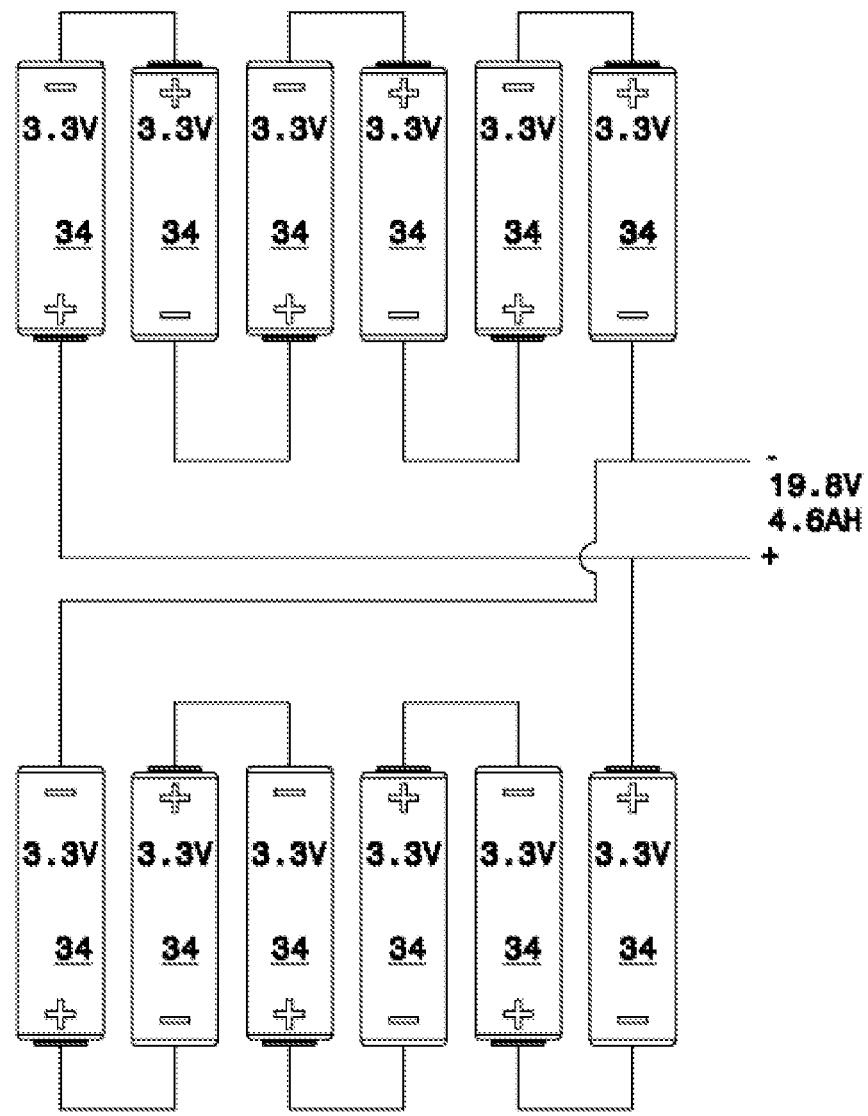
FIG. 5 depicts another switching configuration.

FIG. 5 depicts another switching configuration having two parallel strings of six batteries in series, each. This configuration is suitable for example for a DC to AC convertor 42 that must receive 19.8 volts. Six batteries 34 of 3.3 volts each may be switched by switching circuitry 44 in serial connection, obtaining 3.3×6=19.8 volts.

For 2.3AH batteries, twelve 3.3 volt batteries switched for supplying 19.8 volts provide 4.6 AH.

Figure 6:
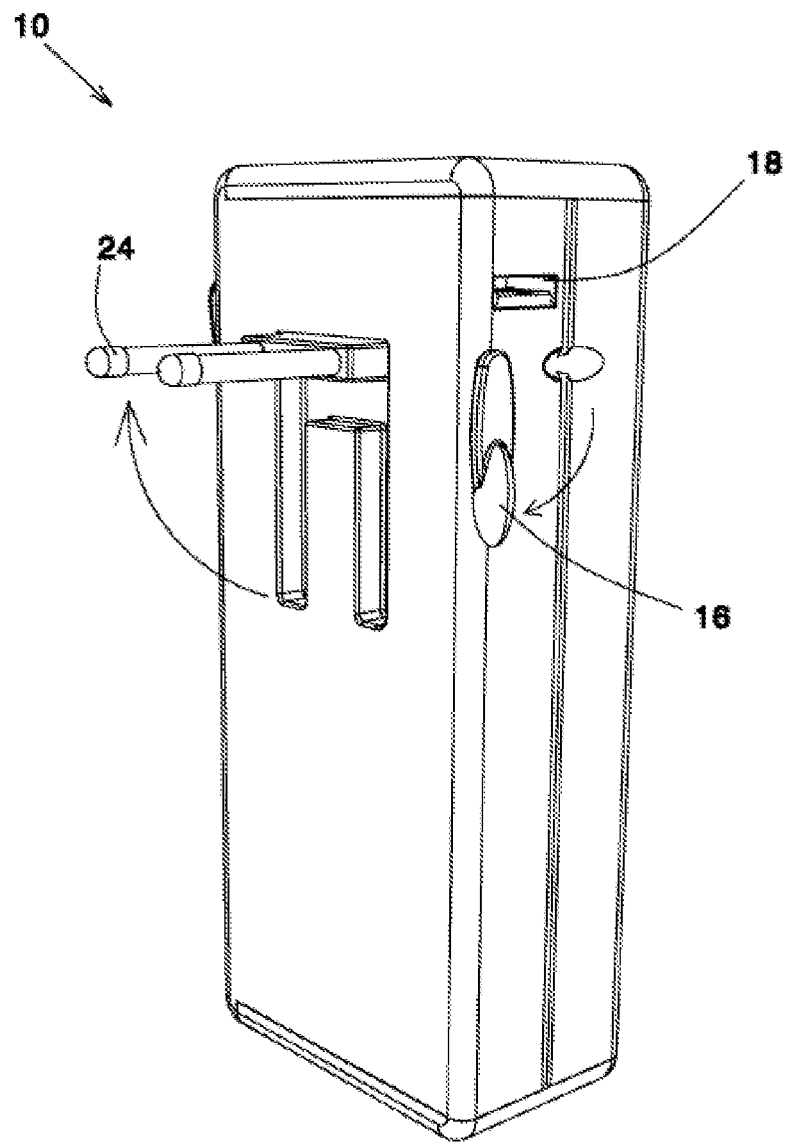
FIG. 6 is a rear view of the power supply of FIG. 1.

FIG. 6 is a rear view of the power supply of FIG. 1. As can be seen from the figure a mechanical button 16 allows use of power plug 24.

Figure 7:
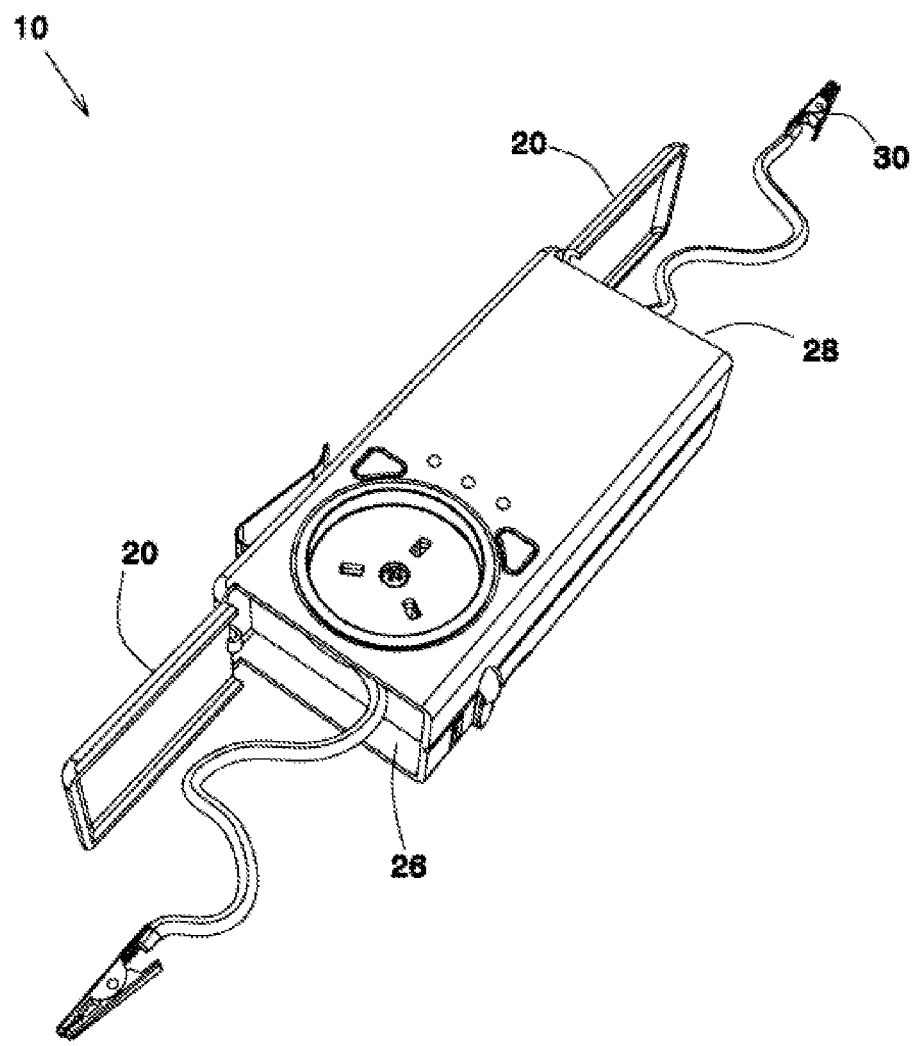
FIG. 7 is an open view of the power supply of FIG. 1.

FIG. 7 is a view of the power supply of FIG. 1 with top and bottom 20 opened.

Figure 8:
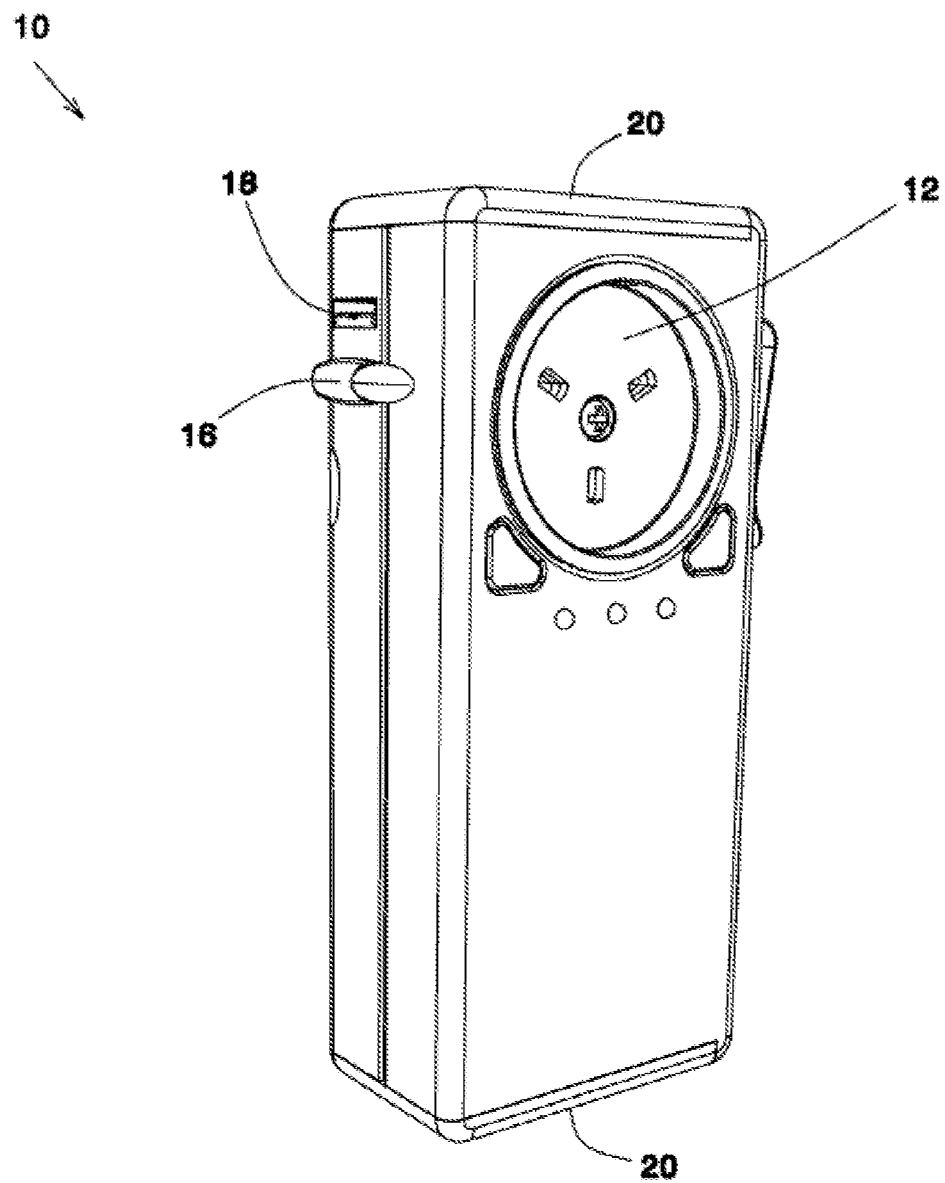
FIG. 8 is a closed view of the power supply of FIG. 1.

FIG. 8 is a view of the power supply of FIG. 1 with top and bottom 20 closed.

Covers 20 (FIG. 7,8) cover the output wires 30, which may be of a length sufficient, for example, for charging a vehicle's battery.

The example of twelve 2.3AH 3.3V batteries switched for supplying 13.2 volts providing 6.9 AH (such as of AI23 lithium-ion batteries) may start a car several dozens of times, if the duration of each start is a matter of seconds.

This configuration may run a screwdriver for an hour, or a portable computer for 12 hours, or a cellular phone for 120 days.

Figure 9:
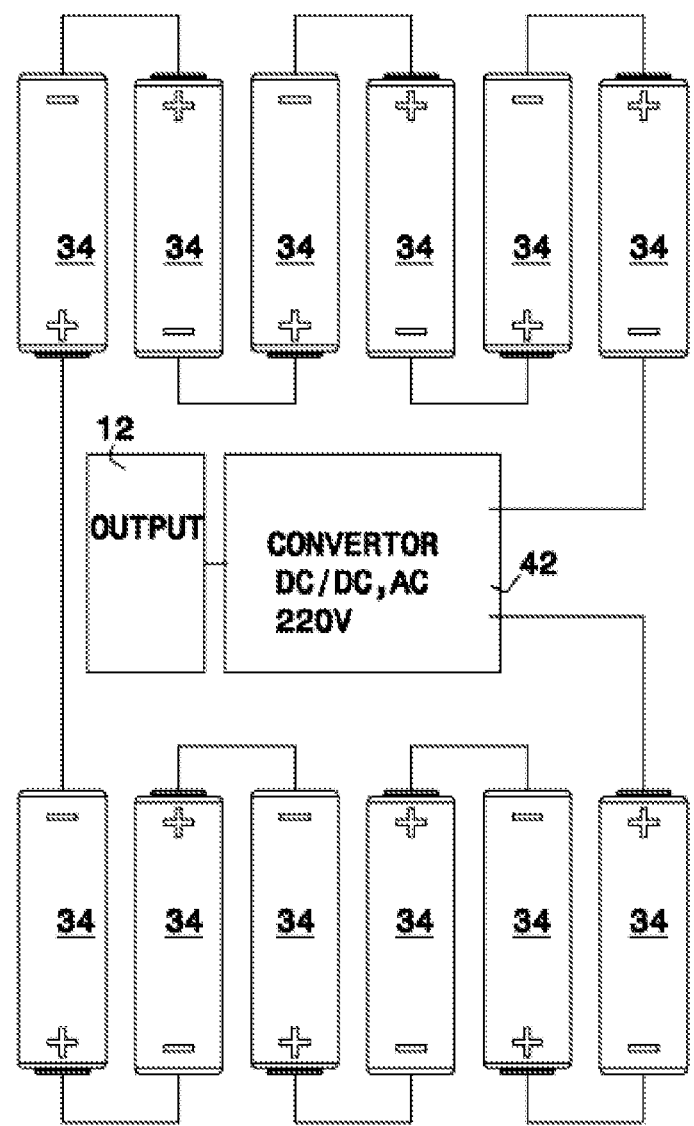
FIG. 9 schematically illustrates the circuitry of FIG. 1 according to another embodiment.

FIG. 9 schematically illustrates the circuitry of FIG. 1 according to another embodiment. According to this embodiment, the connection topology is permanent. However, converter 42 converts the voltage to USB port 18, AC socket 12, or crocodile clips 30 according to the requirement, the inverter being able to supply both DC and AC at various voltages.

Figure 10:
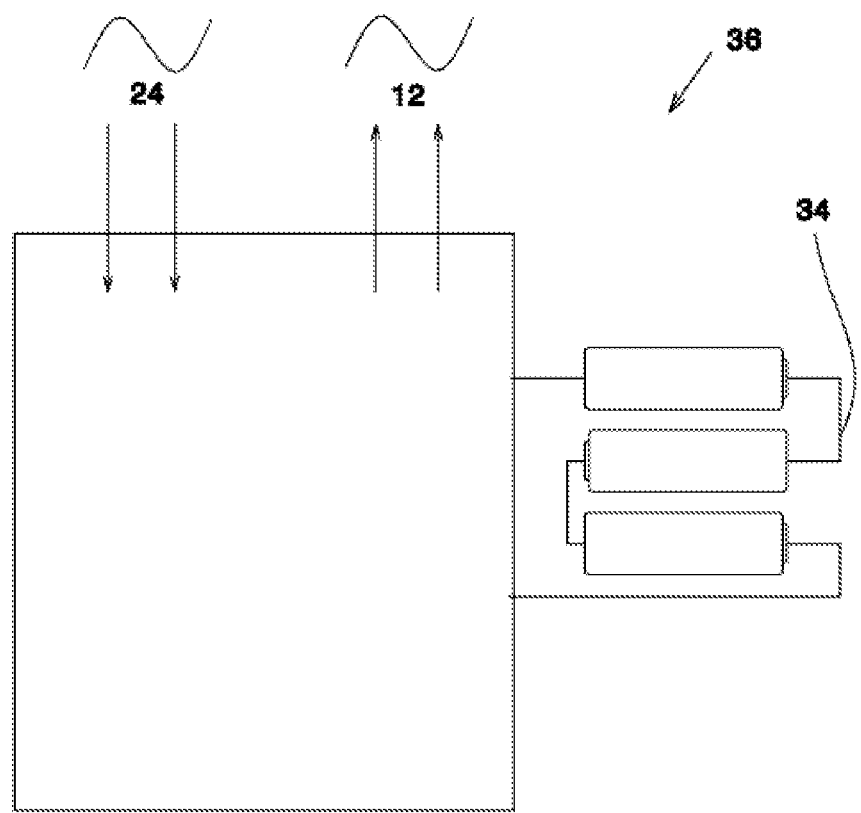
FIG. 10 schematically illustrates the circuitry of FIG. 1 according to another embodiment.

FIG. 10 is a circuit of the power supply of FIG. 1 according to another embodiment.

According to one embodiment batteries 34 may be permanently connected one to the other for receiving and for supplying a certain voltage, e.g. 12 volts.

Circuit assembly 36 converts the AC supply received by AC power plug 24 to that certain voltage for charging batteries 34 as connected. Circuit assembly 36 also inverts that certain DC voltage supplied by batteries 34 when charged for supplying AC power to AC socket 12.

According to this example batteries 34 are connected to supply 12 volt, circuit assembly 36 converts the AC supply to 12 volt DC, and also inverts 12 volt DC supplied by batteries 34 to AC power into AC socket 12.

Circuit assembly includes a single transformer both for the AC to DC conversion, and for the DC to AC inversion.

Figure 11:
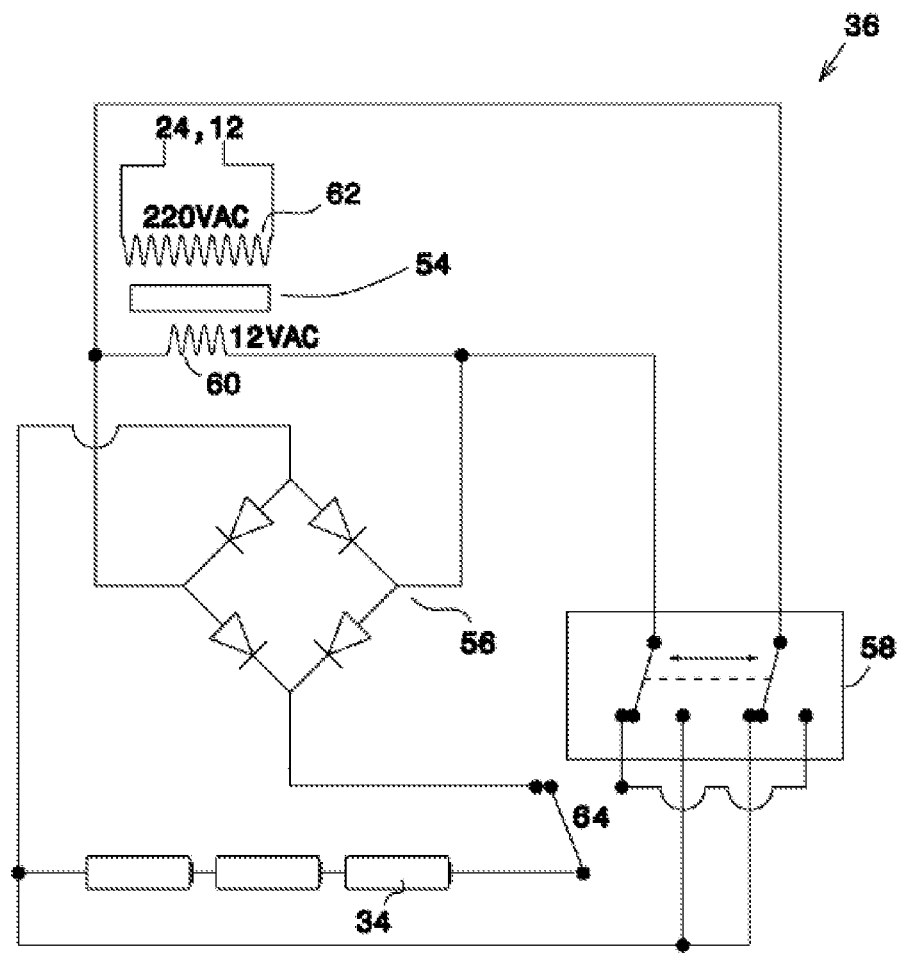
FIG. 11 schematically illustrates the circuitry of FIG. 1 according to another embodiment.

FIG. 11 depicts one example of the circuit assembly of FIG. 10.

The AC supply from AC power plug 24, e.g. 220 VAC is received by a primary winding 62 of a transformer 54, and is transformed to a lower alternating voltage, such as to 12 VAC to a secondary winding 60 of transformer 54.

The 12 VAC according to this example is rectified by a voltage rectifier 56, such as a Wheatstone diode bridge, to the certain DC voltage, which is 12 VDC according to the example.

This DC voltage is supplied to batteries 34 for recharging them when switch 64, which may be manual, connects batteries 34 to rectifier 56.

Upon changing switch 64 to connect batteries 34 to a DC to AC inverter 58 instead of to rectifier 56, circuit assembly 36 inverts that certain voltage supplied by batteries 34 when charged for supplying AC power to AC socket 12.

The 12 VDC supplied by batteries 34 according to this example is inverted by a DC to AC inverter 58, which may constitute two switches (such as FET switches) connecting batteries 34 to secondary winding 60 of transformer 54. The switches of inverter 58 change the polarity of the batteries connected to secondary winding 60 back and forth, thus supplying a low voltage square wave at the switching frequency of the switches. For example 12 VAC is supplied to secondary winding 60, and is transformed to a high alternating voltage to primary winding 62 of transformer 54.

Thus, transformer 54, which is the heavy element functions for both conversions.

Power plug 24 and AC socket 12 may be separated one from the other by appropriate switching, even though both constitute primary winding 62 of transformer 54.

As has been described above, the extant voltage of the device to be powered may be measured by the inventive device in an attempt to determine the necessary voltage required to power the device to be powered. If a nonzero voltage (e.g. larger than some predetermined threshold) is measured, then that voltage (possibly with some predetermined offset) is output to the device to be powered. If on the other hand the measured voltage is smaller than the predetermined threshold, then the impedance $Z_{extant}$ of the device to be powered is measured. If this impedance is larger than some threshold $Z_{threshold}$ then an AC voltage (for example 220 VAC) is supplied. If both voltage and impedance are lower than their respective thresholds, no automatic setting is applied and the user must use the various switches on the inventive device to set the output voltage.

This may all be summed up in the equation $$V_{out} = \begin{cases} V_{extant} + \delta V; & |V_{extant}| > V_{threshold} \\ A\sin(\omega t); & |V_{extant}| < V_{threshold} \text{ and } Z_{extant} > Z_{threshold} \end{cases}$$

where $V_{extant}$ is the measured voltage of the device to be powered, $V_{threshold}$ is the threshold voltage, $Z_{extant}$ is the measured impedance of the device to be powered, and $Z_{threshold}$ is the threshold impedance.

The foregoing description and illustrations of the embodiments of the invention has been presented for the purposes of illustration. It is not intended to be exhaustive or to limit the invention to the above description in any form.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A portable power supply for supplying power to an external load, comprising:
   a power input interface for receiving alternating current (AC) voltage from a mains power supply;
   an AC to DC converter operatively coupled to the power input interface for converting the received AC voltage to DC voltage;
   a plurality of rechargeable batteries for receiving DC voltage from the AC to DC converter as input and for supplying DC voltage as output;
   an inverter for operatively coupling and decoupling to the plurality of batteries;
   a sensor for measuring a plurality of power parameters of the external load, the power parameters providing an indication of power requirements of the external load and whether the external load is an AC or a DC external load; and
   a switching assembly switchably coupled to the AC to DC converter, the plurality of batteries, the inverter, and the sensor, the switching assembly configured for switching between four switch states and for arranging the plurality of batteries in a configurable topography selected from a plurality of topographies, each topography having a corresponding voltage and current,
   such that, when the power input interface is operatively coupled to the mains power supply and the portable power supply is de-coupled from the external load, the switching assembly assumes a first switch state, in which, the DC voltage from the AC to DC converter is supplied to the plurality of batteries to charge the batteries, and the topography of the batteries is configured to match the voltage and current draw from the AC to DC converter,
   and such that, when the power input interface is decoupled from the mains power supply and the portable power supply is coupled to the external load, the switching assembly assumes a second switch state, in which, the power parameters of the external load are measured by the sensor to determine whether the external load is an AC or DC external load,
   and such that, if the external load is determined to be an AC external load based on the power parameters measured by the sensor when in the second switch state, the switching assembly assumes a third switch state, in which, the topography of the batteries is reconfigured based on the power parameters measured by the sensor when in the second switch state, the plurality of batteries are operatively coupled to the inverter, the output DC voltage from the plurality of batteries in the reconfigured topography is supplied to the inverter to supply AC voltage to the AC external load, and the supplied AC voltage is a desired function of at least a subset of the power parameters measured by the sensor when in the second switch state,
   and such that, if the external device is determined to be a DC external load based on the power parameters measured by the sensor when in the second switch state, the switching assembly assumes a fourth switch state, in which, the topography of the batteries is reconfigured based on the power parameters measured by the sensor when in the second switch state, and the output DC voltage from the plurality of batteries in the reconfigured Topography is supplied to the DC external load.

2. The portable power supply of claim 1, wherein the plurality of power parameters includes: an extant voltage of the external load, an extant impedance of the external load, and an extant resistance of the external load.

3. The portable power supply of claim 2, wherein the external load is determined to be an AC external load if the measured extant resistance of the external load satisfies a threshold criterion.

4. The portable power supply of claim 2, wherein desired function is:

$$V_{out} = \begin{cases} V_{extant} + \delta V; & |V_{extant}| > V_{threshold} \\ A\sin(\omega t); & |V_{extant}| < V_{threshold} \text{ and } Z_{extant} > Z_{threshold} \end{cases}$$

wherein $V_{extant}$ is the extant voltage, $V_{threshold}$ is a threshold voltage, $Z_{extant}$ is the extant impedance, and $Z_{threshold}$ is a threshold impedance.

5. The portable power supply of claim 1, wherein if the external load is determined to be a DC external load based on the power parameters measured by the sensor when in the second switch state, the switching assembly is further configured for:
   alternatingly switching between the second and fourth switch states until at least one threshold criterion is satisfied.

6. The portable power supply of claim 5, wherein the DC external load includes a rechargeable battery, and wherein the threshold criterion includes the rechargeable battery of the DC external load reaching a threshold voltage.

7. A method for supplying power, comprising:
   receiving alternating current (AC) voltage from a mains power supply;

converting the received AC voltage to a direct current (DC) voltage;

arranging a plurality of rechargeable batteries in a first topography selected from a plurality of topographies, each topography having a corresponding voltage and current, the first topography being selected according to the DC voltage;

supplying the DC voltage to the plurality of batteries to charge the plurality of batteries;

interrupting the AC voltage received from the mains power supply;

connecting an external load, the external load being either an AC load or a DC load;

determining if the external load is an AC load or a DC load by measuring a plurality of power parameters of the external load;

if the external load is determined to be an AC load:
arranging the plurality of batteries in a second topography according to the measured of the power parameters,
supplying a DC voltage from the plurality of batteries in the second topography,
inverting the supplied DC voltage to generate an AC voltage, and
supplying the generated AC voltage to the AC load, the generated AC voltage being a desired function of at least a subset of the measured power parameters, and if the external load is determined to be a DC load:
arranging the plurality of batteries in a third topography according to the measured of the power parameters, and
supplying a DC voltage from the plurality of batteries in the third topography to the DC load.

8. The method of claim 7, wherein the plurality of power parameters includes: an extant voltage of the external load, an extant impedance of the external load, and an extant resistance of the external load.

9. The method of claim 8, wherein desired function is:

$$V_{out} = \begin{cases} V_{extant} + \delta V; & |V_{extant}| > V_{threshold} \\ A\sin(\omega t); & |V_{extant}| < V_{threshold} \text{ and } Z_{extant} > Z_{threshold} \end{cases}$$

wherein $V_{extant}$ is the extant voltage, $V_{threshold}$ is a threshold voltage, $Z_{extant}$ is the extant impedance, and $Z_{threshold}$ is a threshold impedance.

10. The method of claim 7, wherein the DC load includes a rechargeable battery, and the method further comprises:
if the external load is determined to be a DC load:
disconnecting the DC load,
subsequently measuring a plurality of power parameters of the DC load and arranging the plurality of batteries in a subsequent topography according to the subsequently measured of the power parameters,
reconnecting the DC load and supplying a DC voltage from the plurality of batteries in the subsequent topography to the DC load until at least one threshold criterion is satisfied.

11. The method of claim 10, wherein the at least one threshold criterion includes the rechargeable battery of the DC load reaching a threshold voltage.

* * * * *